United States Patent
Yang et al.

(10) Patent No.: US 11,317,295 B2
(45) Date of Patent: Apr. 26, 2022

(54) COMMUNICATIONS METHOD AND APPARATUS

(71) Applicant: HUAWEI TECHNOLOGIES CO., LTD., Guangdong (CN)

(72) Inventors: Kun Yang, Shenzhen (CN); Ronghui Wen, Beijing (CN); Feng Yu, Beijing (CN); Guangwei Yu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 65 days.

(21) Appl. No.: 16/828,873

(22) Filed: Mar. 24, 2020

(65) Prior Publication Data
US 2020/0228995 A1 Jul. 16, 2020

Related U.S. Application Data

(63) Continuation of application No. PCT/CN2017/103178, filed on Sep. 25, 2017.

(51) Int. Cl.
*H04W 16/14* (2009.01)
*H04W 72/12* (2009.01)
(Continued)

(52) U.S. Cl.
CPC ....... *H04W 16/14* (2013.01); *H04W 72/1273* (2013.01); *H04W 74/006* (2013.01); *H04W 74/0808* (2013.01)

(58) Field of Classification Search
CPC ............. H04W 16/14; H04W 72/1273; H04W 74/006; H04W 74/0808; H04W 72/1289
(Continued)

(56) References Cited

U.S. PATENT DOCUMENTS

2016/0127098 A1 5/2016 Ng et al.
2017/0048879 A1* 2/2017 Zhang ............... H04W 72/1226
(Continued)

FOREIGN PATENT DOCUMENTS

CN 104994591 A 10/2015
CN 106922032 A 7/2017
(Continued)

OTHER PUBLICATIONS

Samsung: "Channel access for autonomous UL access", 3GPP DRAFT;R1-1713524,Aug. 20, 2017 (Aug. 20, 2017), XP051316324,total 4 pages.
(Continued)

*Primary Examiner* — Kwang B Yao
*Assistant Examiner* — Syed M Bokhari
(74) *Attorney, Agent, or Firm* — Womble Bond Dickinson (US) LLP

(57) ABSTRACT

In the method, the network device sends first signaling to a first terminal device, the first signaling is used to instruct the first terminal device to perform, on an unlicensed spectrum, a listen before talk LBT procedure used for occupying an unlicensed frequency band, and send uplink information within a first time length on the unlicensed frequency band; the network device receives, on the unlicensed spectrum, the uplink information from the first terminal device within the first time length, where the first time length is a part of maximum channel occupancy time obtained by the first terminal device on the unlicensed spectrum, and the first time length is less than the maximum channel occupancy time.

20 Claims, 10 Drawing Sheets

(51) Int. Cl.
*H04W 74/00* (2009.01)
*H04W 74/08* (2009.01)

(58) Field of Classification Search
USPC .................................................. 370/329, 336
See application file for complete search history.

(56) References Cited

U.S. PATENT DOCUMENTS

| | | | | |
|---|---|---|---|---|
| 2017/0222749 A1* | 8/2017 | Dinan | .................... | H04W 52/08 |
| 2017/0238334 A1* | 8/2017 | Yang | ................. | H04W 74/0808 |
| | | | | 370/336 |
| 2017/0238342 A1 | 8/2017 | Yang et al. | | |
| 2017/0245302 A1 | 8/2017 | Mukherjee et al. | | |
| 2019/0200379 A1* | 6/2019 | Wang | ................ | H04W 74/0808 |

FOREIGN PATENT DOCUMENTS

| | | |
|---|---|---|
| CN | 107079464 A | 8/2017 |
| GN | 103391624 A | 11/2013 |
| GN | 104205682 A | 12/2014 |
| WO | 2017099860 A1 | 6/2017 |
| WO | 2017126935 A1 | 7/2017 |
| WO | 2017147760 A1 | 9/2017 |
| WO | 2018144976 A2 | 8/2018 |

OTHER PUBLICATIONS

Ericsson: "On Channel Access for AUL", 3GPP Draft; R1-1713312,Aug. 20, 2017 (Aug. 20, 2017),XP051316116, total 4 pages.

Intel Corporation: "Consideration on channel access mechanism forautonomous uplink access", 3GPP Draft R1-1712480,Aug. 20, 2017 (Aug. 20, 2017),XP051315296,total 4 pages.

ZTE: "Discussion on the UL LBT for LAA", 3GPP Draft; R1-164603,May 13, 2016 (May 13, 2016), XP051096884,total 10 pages.

LG Electronics: "LBT schemes in LAA UL", 3GPP Draft; R1-160630,Feb. 14, 2016 (Feb. 14, 2016), XP051053959,total 10 pages.

ZTE: "WF on UE initiated TxOP/MCOT shared by the eNB", 3GPP DRAFT;R1-164605,May 13, 2016 (May 13, 2016), XP051088664,total 4 pages.

* cited by examiner

COMMUNICATIONS METHOD AND APPARATUS

CROSS-REFERENCE TO RELATED APPLICATIONS

This application is a continuation of International Application No. PCT/CN2017/103178, filed on Sep. 25, 2017, the disclosure of which is hereby incorporated by reference in its entirety.

TECHNICAL FIELD

This disclosure relates to the field of wireless communications technologies, and in particular, to a communications method and apparatus.

BACKGROUND

With rapid development of applications of wireless communication, users have an increasingly high requirement on a capacity and a rate of a wireless network. Especially in a popular area (a large market, a stadium, or the like) in which wireless users are dense, it is very difficult to provide all users with high-quality services at the same time by using a licensed spectrum. In addition, currently, suitable spectrum allocation tends to be insufficient in the world, and costs of purchasing a licensed frequency band by an operator also become increasingly high. To reduce frequency band costs of the wireless network, and alleviate service pressure of the licensed frequency band, a long term evolution (Long Term Evolution, LTE) communications system on an unlicensed spectrum is designed in the wireless communications network.

A licensed assisted access (Licensed assisted access, LAA) system is a long term evolution (Long Term Evolution, LTE) system that uses the unlicensed spectrum to perform data communication. The LAA system uses a listen before talk (Listen before talk, LBT) preemption mechanism to obtain a channel occupancy right of an unlicensed frequency band, a terminal device/network device that obtains the channel occupancy right may send data, and a time length of sending the data cannot exceed maximum channel occupancy time (Maximum channel occupancy time, MCOT). The LBT preemption mechanism ensures fairness that the LAA system and a Wi-Fi system coexist in the unlicensed frequency band. Both an LAA terminal device and an LAA network device should perform an LBT procedure before sending data. The LBT procedure of preempting a channel includes a clear channel assessment (Clear Channel Assessment, CCA). That is, a corresponding unlicensed frequency band is monitored, and if signal energy received in the frequency band within monitoring time is less than a decision threshold, it is considered that a channel is idle and can be occupied; otherwise, it is considered that the channel is busy and cannot be occupied.

Usually, in a network, a downlink data volume is much higher than an uplink data volume, and a volume of to-be-sent uplink data of some terminal devices even fails to occupy the whole MCOT. On the unlicensed frequency band, a quantity of terminal devices is much greater than a quantity of network devices. Therefore, because a large quantity of terminal devices frequently preempt the unlicensed frequency band to perform uplink transmission, the network device or a terminal device having a large volume of uplink data to be transmitted is difficult to preempt the occupancy right of the unlicensed frequency band to perform downlink transmission. Consequently, a delay of data transmission becomes large. Moreover, a terminal device having relatively few to-be-sent uplink data usually only uses a part of the MCOT after preempting the occupancy right of the unlicensed frequency band by performing the LBT procedure, causing relatively low utilization of the unlicensed frequency band.

SUMMARY

Embodiments of the present disclosure describe a communications method and apparatus. To resolve a problem of a large delay of downlink data caused by difficulties in preempting a downlink channel by a network device.

According to a first aspect, an embodiment of the present disclosure provides a communications method, and the method includes: sending, by a network device, first signaling to a first terminal device, where the first signaling is used to instruct the first terminal device to perform, on an unlicensed spectrum, a listen before talk LBT procedure used for occupying an unlicensed frequency band, and send uplink information within a first time length on the unlicensed frequency band; and receiving, by the network device, on the unlicensed spectrum, the uplink information from the first terminal device within the first time length, where the first time length is a part of maximum channel occupancy time obtained by the first terminal device on the unlicensed spectrum, and the first time length is less than the maximum channel occupancy time. By using the solution provided in this embodiment, the network device may schedule the first terminal device to assist in preempting the unlicensed frequency band. By specifying an uplink sending time length of the first terminal device, lengths of remaining available parts within MCOT time of the first terminal device are known, and the network device or another terminal device may use the remaining available parts to perform data transmission, thereby reducing a delay of transmission including downlink transmission.

In one embodiment, the uplink information includes uplink data or specified information; and the first time length is a preset value, or the first time length is a value semi-statically configured by using higher layer signaling; or the first time length is notified by using physical layer signaling. That is, when the first terminal includes to-be-sent uplink data, the first time length may be used to send the uplink data. When the first terminal excludes the to-be-sent uplink data, the first time length may be used to send the specified information. Therefore, the first time length may be fully used to send valuable information.

In one embodiment, before the sending, by a network device, first signaling to a first terminal device, the method further includes: determining, by the network device, that the first signaling is used to instruct the first terminal device to send the uplink data or the specified information, where when the first terminal device has uplink data to be sent, the first signaling is used to instruct the first terminal device to send the uplink data within the first time length by using the unlicensed spectrum; and when the first terminal device has no uplink data to be sent, the first signaling is used to instruct the first terminal device to send the specified information within the first time length by using the unlicensed spectrum. In the possible design, a type of the specified information is channel state information, a measurement report, a buffer status report, an uplink reference signal, or a trailing bit.

In one embodiment, the first signaling includes at least one bit, and is used to indicate at least one piece of the following information: an initiation time K1 of an uplink listen before talk LBT procedure, an LBT procedure priority, a subcarrier set used to send the uplink information, the first time length, and a type of the specified information.

In one embodiment, the network device sends, after the first time length, first downlink control information and downlink data within a second time length by using the unlicensed frequency band preempted by the first terminal device, where the unlicensed frequency band preempted by the first terminal device is an unlicensed frequency band on which the uplink information sent by the first terminal device is received, and the first downlink control information is used to schedule the first terminal device or a second terminal device to receive the downlink data within the second time length by using the unlicensed frequency band preempted by the first terminal device. By using the method provided in this embodiment, to-be-sent downlink data of the network device may be sent by using the MCOT of the unlicensed frequency band preempted by the first terminal device, thereby reducing a delay of sending the downlink data.

In one embodiment, an end time of the first time length is K2, a start time of the second time length is K3, because of a physical delay of uplink and downlink switch, the time K2 and the time K3 are spaced by M1 OFDM symbol lengths, and M1 is an integer greater than 0.

In one embodiment, the second time length follows the first time length, and a sum of the second time length and the first time length is less than or equal to the maximum channel occupancy time obtained by the first terminal device on the unlicensed spectrum.

In one embodiment, the method includes: sending, by the network device, second downlink control information within the second time length by using the unlicensed frequency band preempted by the first terminal device; or sending, by the network device, second downlink control information by using a licensed frequency band, where the second downlink control information is used to schedule the first terminal device or the second terminal device or a third terminal device to transmit the uplink data within a third time length by using the unlicensed frequency band preempted by the first terminal device.

In one embodiment, the sending, by the network device, second downlink control information by using a licensed frequency band includes: sending, by the network device, before the end time of the first time length, the second downlink control information by using the licensed frequency band; or sending, by the network device, before an end time of the second time length, the second downlink control information by using the licensed frequency band.

In one embodiment, the second downlink control information includes at least one bit, and is used to indicate at least one piece of the following information: a subcarrier set used to transmit the uplink data, the third time length, and a start time K4 of the third time length; or, the second downlink control information includes at least one bit, and is used to indicate a start time K4 of the third time length, and the method further includes: sending, by the network device, third downlink control information before sending the second downlink control information, where the third downlink control information includes at least one bit, and is used to indicate a subcarrier set used to transmit the uplink data and/or the third time length.

In the possible design, an end time of the second time length is K5, the start time of the third time length is K4, the time K4 and the time K5 are spaced by M2 OFDM symbol lengths, and M2 is an integer greater than 0; or the end time of the first time length is K2, the start time of the third time length is K4, the time K4 and the time K2 are spaced by M3 OFDM symbol lengths, and M3 is an integer greater than 0.

In one embodiment, the third time length follows the first time length, and a sum of the third time length and the first time length is less than or equal to the maximum channel occupancy time; or the second time length follows the first time length, the third time length follows the second time length, and a sum of the third time length, the second time length, and the first time length is less than or equal to the maximum channel occupancy time obtained by the first terminal device on the unlicensed spectrum.

In one embodiment, after the first time length, and before the network device sends the first downlink control information by using the unlicensed frequency band preempted by the first terminal device, the method further includes: performing, by the network device, a downlink short time LBT procedure.

According to a second aspect, an embodiment of the present disclosure provides a wireless apparatus, including a processor and a transceiver connected to the processor. The transceiver is configured to send or receive a signal. The processor is configured to send first signaling to a first terminal device by using the transceiver, where the first signaling is used to instruct the first terminal device to perform, on an unlicensed spectrum, a listen before talk LBT procedure used for occupying an unlicensed frequency band, and send uplink information within a first time length on the unlicensed frequency band; and the processor is further configured to receive, on the unlicensed frequency band, the uplink information from the first terminal device within the first time length by using the transceiver, where the first time length is a part of maximum channel occupancy time obtained by the first terminal device on the unlicensed frequency band, and the first time length is less than the maximum channel occupancy time.

In one embodiment, the uplink information includes uplink data or specified information; and the first time length is a preset value, or the first time length is a value semi-statically configured by using higher layer signaling; or the first time length is notified by using physical layer signaling.

In one embodiment, the processor is further configured to: before sending the first signaling to the first terminal device, determine that the first signaling is used to instruct the first terminal device to send the uplink data or the specified information, where when the first terminal device has uplink data to be sent, the first signaling is used to instruct the first terminal device to send the uplink data within the first time length by using the unlicensed spectrum; and when the first terminal device has no uplink data to be sent, the first signaling is used to instruct the first terminal device to send the specified information within the first time length by using the unlicensed spectrum.

In one embodiment, a type of the specified information is channel state information, a measurement report, a buffer status report, an uplink reference signal, or a trailing bit.

In one embodiment, the first signaling includes at least one bit, and is used to indicate at least one piece of the following information: an initiation time K1 of an uplink listen before talk LBT procedure, an LBT procedure priority, a subcarrier set used to send the uplink information, the first time length, and a type of the specified information.

In one embodiment, the processor is configured to send, after the first time length, first downlink control information and downlink data within a second time length by using the transceiver using the unlicensed frequency band preempted by the first terminal device, and the unlicensed frequency band preempted by the first terminal device is an unlicensed frequency band on which the uplink information sent by the first terminal device is received; and the first downlink control information is used to schedule the first terminal device or a second terminal device to receive the downlink data within the second time length by using the unlicensed frequency band preempted by the first terminal device.

In one embodiment, an end time of the first time length is K2, a start time of the second time length is K3, the time K2 and the time K3 are spaced by M1 OFDM symbol lengths, and M1 is an integer greater than 0.

In the possible design, the second time length follows the first time length, and a sum of the second time length and the first time length is less than or equal to the maximum channel occupancy time.

In one embodiment, the processor is configured to send second downlink control information within the second time length by using the transceiver using the unlicensed frequency band preempted by the first terminal device; or the processor is configured to send second downlink control information by using the transceiver using a licensed frequency band; and the second downlink control information is used to schedule the first terminal device or the second terminal device or a third terminal device to transmit the uplink data within a third time length by using the unlicensed frequency band preempted by the first terminal device.

In one embodiment, the send second downlink control information by using the transceiver using a licensed frequency band includes: sending, before the end time of the first time length, the second downlink control information by using the transceiver using the licensed frequency band; or sending, before an end time of the second time length, the second downlink control information by using the transceiver using the licensed frequency band.

In one embodiment, the second downlink control information includes at least one bit, and is used to indicate at least one piece of the following information: a subcarrier set used to transmit the uplink data, the third time length, and a start time K4 of the third time length; or, the second downlink control information includes at least one bit, and is used to indicate a start time K4 of the third time length, and the processor is further configured to: send third downlink control information by using the transceiver before sending the second downlink control information, where the third downlink control information includes at least one bit, and is used to indicate a subcarrier set used to transmit the uplink data and/or the third time length.

In one embodiment, an end time of the second time length is K5, the start time of the third time length is K4, the time K4 and the time K5 are spaced by M2 OFDM symbol lengths, and M2 is an integer greater than 0; or the end time of the first time length is K2, the start time of the third time length is K4, the time K4 and the time K2 are spaced by M3 OFDM symbol lengths, and M3 is an integer greater than 0.

In one embodiment, the third time length follows the first time length, and a sum of the third time length and the first time length is less than or equal to the maximum channel occupancy time; or the second time length follows the first time length, the third time length follows the second time length, and a sum of the third time length, the second time length, and the first time length is less than or equal to the maximum channel occupancy time.

In one embodiment, after the first time length, and before the transceiver sends the first downlink control information by using the unlicensed frequency band preempted by the first terminal device, the processor is further configured to: perform a downlink short time LBT procedure.

According to a third aspect, an embodiment of the present disclosure provides a communications method, and the method includes: receiving, by a first terminal device, first signaling sent by a network device, where the first signaling is used to instruct the first terminal device to perform, on an unlicensed spectrum, a listen before talk LBT procedure used for occupying an unlicensed frequency band, and send uplink information within a first time length on the unlicensed frequency band; and performing, by the first terminal device based on the first signaling, on the unlicensed spectrum, the LBT procedure used for occupying the unlicensed frequency band, and sending the uplink information within the first time length by using the unlicensed frequency band, where the first time length is a part of maximum channel occupancy time obtained by the first terminal device on the unlicensed spectrum, and the first time length is less than the maximum channel occupancy time. By using the solution provided in this embodiment, the network device may schedule the first terminal device to assist in preempting the unlicensed frequency band. By specifying an uplink sending time length of the first terminal device, lengths of remaining available parts within MCOT time of the first terminal device are known, and the network device or another terminal device may use the remaining available parts to perform data transmission, thereby reducing a delay of transmission including downlink transmission.

In one embodiment, the sending, by the first terminal device, the uplink information within the first time length by using the unlicensed frequency band includes:

when the first signaling is used to instruct the first terminal device to send the uplink data within the first time length by using the unlicensed spectrum, sending, by the first terminal device, the uplink data within the first time length by using the unlicensed frequency band; where when the first signaling is used to instruct the first terminal device to send the specified information within the first time length by using the unlicensed spectrum, and before the first terminal device sends uplink information within the first time length by using the unlicensed frequency band, the method further includes:

determining, by the first terminal device, whether there is uplink data to be sent at a start time of the first time length; where when the first terminal device has uplink data to be sent, the first terminal device sends the specified information and the uplink data within the first time length by using the unlicensed frequency band; and when the first terminal device has no uplink data to be sent, the first terminal device sends the specified information within the first time length by using the unlicensed frequency band.

In one embodiment, the method further includes: receiving, by the first terminal device, after the first time length, first downlink control information and downlink data from the network device within a second time length by using the unlicensed frequency band, where the unlicensed frequency band is an unlicensed frequency band on which the first terminal device sends the uplink information, and the first downlink control information is used to schedule the first terminal device or a second terminal device to receive the downlink data within the second time length by using the unlicensed frequency band. By using the method provided in this embodiment, to-be-sent downlink data of the network device may be sent by using the MCOT of the unlicensed frequency band preempted by the first terminal device, thereby reducing a delay of sending the downlink data.

In one embodiment, an end time of the first time length is K2, a start time of the second time length is K3, the time K2 and the time K3 are spaced by M1 OFDM symbol lengths, and M1 is an integer greater than 0.

In one embodiment, the second time length follows the first time length, and a sum of the second time length and the first time length is less than or equal to the maximum channel occupancy time obtained by the first terminal device.

According to a fourth aspect, a wireless apparatus is provided, and includes a processor and a transceiver connected to the processor.

The processor is configured to receive first signaling sent by a network device by using the transceiver, where the first signaling is used to instruct the first terminal device to perform, on an unlicensed spectrum, a listen before talk LBT procedure for occupying an unlicensed frequency band, and send uplink information within a first time length on the unlicensed frequency band; and the processor is further configured to send, on the unlicensed frequency band, the uplink information within the first time length by using the transceiver, where the first time length is a part of maximum channel occupancy time obtained by the first terminal device on the unlicensed spectrum, and the first time length is less than the maximum channel occupancy time.

In one embodiment, the uplink information includes uplink data or specified information; and the first time length is a preset value, or the first time length is a value semi-statically configured by using higher layer signaling; or the first time length is notified by using physical layer signaling.

In one embodiment, a type of the specified information is channel state information, a measurement report, a buffer status report, an uplink reference signal, or a trailing bit.

In one embodiment, the first signaling includes at least one bit, and is used to indicate at least one piece of the following information: an initiation time K1 of an uplink listen before talk LBT procedure, an LBT procedure priority, a subcarrier set used to send the uplink information, the first time length, and a type of the specified information.

In one embodiment, that the processor is further configured to send, on the unlicensed frequency band, the uplink information within the first time length by using the transceiver includes: when the first signaling is used to instruct the first terminal device to send the uplink data within the first time length by using the unlicensed spectrum, the processor, configured to send, on the unlicensed frequency band, the uplink data within the first time length by using the transceiver; and when the first signaling is used to instruct the first terminal device to send the specified information within the first time length by using the unlicensed spectrum, and before the processor is configured to send, on the unlicensed frequency band, the uplink information within the first time length by using the transceiver, the processor, configured to determine whether there is uplink data to be sent at a start time of the first time length, where when the first terminal device has uplink data to be sent, the processor is configured to send, on the unlicensed frequency band, the specified information and the uplink data within the first time length by using the transceiver; and when the first terminal device has no uplink data to be sent, the processor is configured to send the specified information within the first time length on the unlicensed frequency band by using the transceiver.

In one embodiment, the processor is further configured to receive, after the first time length, first downlink control information and downlink data from the network device within a second time length by using the transceiver using the unlicensed frequency band, the unlicensed frequency band is an unlicensed frequency band on which the first terminal device sends the uplink information, and the first downlink control information is used to schedule the first terminal device or a second terminal device to receive the downlink data within the second time length by using the unlicensed frequency band.

In one embodiment, an end time of the first time length is K2, a start time of the second time length is K3, the time K2 and the time K3 are spaced by M1 OFDM symbol lengths, and M1 is an integer greater than 0.

In one embodiment, the second time length follows the first time length, and a sum of the second time length and the first time length is less than or equal to the maximum channel occupancy time.

According to a fifth aspect, an embodiment of the present disclosure provides a computer storage medium, configured to store a computer software instruction used by the foregoing terminal device. The computer storage medium includes a program instruction designed to perform the foregoing aspects.

According to a sixth aspect, an embodiment of the present disclosure provides a computer storage medium, configured to store a computer software instruction used by the foregoing network device. The computer storage medium includes a program instruction designed to perform the foregoing aspects.

According to a seventh aspect, an embodiment of the present disclosure provides a communications apparatus, the communications apparatus includes a processor and a memory connected to the processor, the processor includes an input output interface, the input output interface is configured to send a signal and receive a signal, the memory is configured to store an instruction, and the processor is configured to read and execute the instruction in the memory, to control the communications apparatus to perform the method in embodiments of the present disclosure.

DESCRIPTION OF EMBODIMENTS

Figure 1:
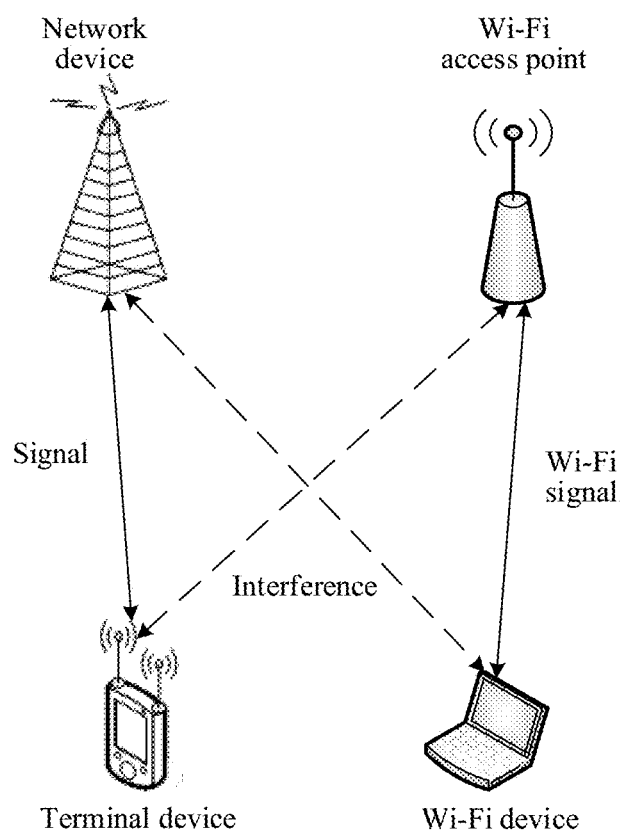
FIG. 1 is a schematic diagram of a network system that is of an unlicensed spectrum and that coexists with Wi-Fi.

The following clearly and completely describes the technical solutions in the embodiments of the present disclosure with reference to the accompanying drawings in the embodiments of the present disclosure.

It should be understood that the present disclosure is applicable to a wireless cellular communications network system using an unlicensed spectrum to communicate, for example, a licensed assisted access (Licensed assisted access, LAA) system, an enhanced licensed assisted access (Enhanced Licensed assisted access, eLAA) system, a further enhanced licensed assisted access (Further Enhanced Licensed Assisted Access, FeLAA) system that are of long term evolution (Long Term Evolution, LTE), a communications system using the unlicensed spectrum and a MulteFire system independently working on the unlicensed spectrum that are in a 5G communications system, and the like. The embodiments of the present disclosure use the eLAA system of the LTE as an example, and do not constitute any limitation to the technical solutions provided in the embodiments of the present disclosure. A person of ordinary skill in the art may learn that with evolution of network architectures and appearance of new service scenarios, the technical solutions provided in the embodiments of the present disclosure are also applicable to similar technical problems.

It should be further understood that, in the embodiments of the present disclosure, the terminal device may also be referred to as user equipment (User Equipment, UE), a mobile station (Mobile Station, MS), a mobile terminal (Mobile Terminal), and the like, the terminal device may communicate with one or more core networks through a radio access network (Radio Access Network, RAN). For example, the terminal device is a device having a wireless receiving and sending function, may be deployed on the land, including an indoor or outdoor device, a handheld device or an in-vehicle device; or may be deployed on the water (for example, on a steamer); or may be deployed in the air (for example, on an air plane, a balloon, or a satellite). The terminal device may be a mobile phone (mobile phone), a tablet computer (for example, Pad), a computer having a wireless receiving and sending function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in telemedicine (also called remote medical), a wireless terminal in a smart grid (smart grid), a wireless terminal in transportation safety (transportation safety), a wireless terminal in a smart city (smart city), a wireless terminal in a smart home (smart home), or the like.

In the embodiments of the present disclosure, the network device (for example, a network device 201) is an apparatus deployed in the radio access network and configured to provide a wireless communication function for the terminal device. The network device may include macro base stations, micro base stations (also referred to as small cells), relay stations, and access points in various forms. The network device may be a base transceiver station (Base Transceiver Station, BTS) in GSM or CDMA, or may be a NodeB (NodeB, NB) in WCDMA, or may be an evolved NodeB (Evolved Node B, eNB, or e-NodeB) in the LTE or eLTE, or may be a next-generation mobile network, for example, a base station gNB ((next) generation NodeB) in 5G (fifth generation).

FIG. 1 shows a network system in which an LAA terminal device and a Wi-Fi device coexist on an unlicensed spectrum. To enable the LAA terminal device and the Wi-Fi device to enjoy resources fairly on an unlicensed frequency band, the LAA terminal device accessing the unlicensed spectrum should monitor and detect a channel idle condition by using a listen before talk (Listen Before Talk, LBT) mechanism. According to an unlicensed spectrum regulation, for example, the European telecommunications standards institute (European Telecommunications Standards Institute, ETSI), an LBT channel preemption mechanism includes two types of LBT mechanisms: a frame based (Frame Based, FB) LBT mechanism and a load based (Load Based, LB) LBT mechanism. In the FB LBT procedure, the terminal device/network device complies with a periodical radio frame structure, and can only start to send data at a start time of the radio frame. One FB LBT cycle includes clear channel assessment (Clear Channel Assessment, CCA) time, channel occupancy time and idle time. A cycle of the LBT is fixed, and the CCA time is at a very beginning of the detection period of each idle channel, that is, monitoring the unlicensed frequency band for fixed time, if the signal energy received on the monitoring frequency band in the monitoring time is less than a decision threshold, it is considered that the channel is idle and can be occupied; otherwise, it is considered that the channel is busy and cannot be occupied. If the channel detected in the CCA time is busy, data cannot be sent in the following channel occupancy time, the terminal device/network device should wait after a next cycle start subframe performs the CCA, and determine again whether the channel can be occupied. In the LB LBT procedure, the terminal device does not have a fixed LBT cycle, and starts the LBT procedure only in a case of which the terminal device has data to send. The terminal device first performs the CCA based on the regulation and determines whether the channel is idle; if the channel is occupied, the CCA is continuously performed based on the regulation until the channel is idle; and if the channel is idle, a contention backoff window (a minimize time granularity of the contention backoff window is 9 us) of a random time length is generated. In the contention backoff window, the device continuously monitors the unlicensed frequency band. When the contention backoff window ends, if the channel is idle, the device starts to occupy the channel to send data; and if in the contention backoff process, the channel is monitored to be occupied, the contention backoff process is suspended, the CCA is performed based on the regulation, and the contention backoff process does not continue to be performed until the channel is idle again. The terminal device/network device does not have a limit of a radio frame boundary, and when the LB LBT procedure ends, sending of data may be immediately started.

The 3GPP standard uses two types of the LBT mechanism, one is the load based LBT mechanism, that is, a random backoff LBT of a non-fixed-length contention window, and is referred to as a Category 4 (Category4, Cat. 4) LBT in the standard. The Cat. 4 LBT may be an LBT mechanism of preempting the unlicensed frequency band before the network device sends information in a physical uplink shared channel (Physical Downlink Shared Channel, PDSCH) or a physical downlink control channel (Physical Downlink Control Channel, PDCCH), and before the terminal device sends information in a physical uplink shared channel (Physical Uplink Shared Channel, PUSCH). The other one is the frame based LBT mechanism, that is, an LBT without random backoff, and is referred to as a type 2 LBT in the 3GPP standard, and the type 2 LBT may be an LBT mechanism of accessing the unlicensed frequency band when the network device broadcasts a discovery reference signal (Discovery Reference Signal, DRS). In the LAA system, a radio frame slot structure of the unlicensed frequency band is the same as a slot structure of the licensed frequency band, and a frame boundary of the radio frame slot structure of the unlicensed frequency band is consistent with a frame boundary of the slot structure of the licensed frequency band. It should be understood that, after successfully performing the Cat. 4 LBT, the network device or the terminal device may obtain the maximum channel occupancy time MCOT on the unlicensed frequency band.

When the network device has a large quantity of downlink data to be sent by using the unlicensed frequency band, a situation that the downlink channel is difficult to be preempted or a situation that the channel should be preempted for a plurality of times exists. For example, a plurality of terminal devices in the coverage range should send uplink data, the network device should compete with the plurality of terminal devices for a right of use of preempting the unlicensed frequency band. Therefore, the time be consumed by the network device to perform the LBT procedure increases, causing a large delay for the network device to send downlink data. Because a time length within which the network device can send data after preempting the unlicensed frequency band cannot exceed an upper limit of a time length stipulated in the regulation, in a situation that the downlink data is relatively large, the network device should perform the channel preemption process for a plurality of times to complete sending the downlink data. Consequently, a delay of the downlink data of the network device increases. For an operation of which the plurality of terminal devices independently preempt the channel, times of terminal devices completing the preemption are different, and to avoid a frequency resource conflict, the complexity of the uplink resource allocation is increased. The LAA system has not yet designed solutions for resolving these problems.

To resolve the problem that is of a large delay of the downlink data caused by difficulties in preempting a downlink channel by a network device and that exists in the wireless system (LAA, MulteFire, and the like) on the unlicensed spectrum, this embodiment of the present disclosure provides a communications method. The network device centralized controls the terminal device to preempt the unlicensed frequency band, and limits a time length of uplink sending of the terminal device. Because the network device limits the time length of uplink sending when scheduling the terminal device, the network device may exactly learn of the remaining time of the maximum channel occupancy time (Maximum channel occupancy time, MCOT) of the terminal device, thereby accurately scheduling the downlink data transmission or scheduling another terminal device that should send data to send data by using the remaining time. The solution of using the remaining time of the MCOT by the network device is equivalent to increasing a probability that the network device obtains an occupancy right of the unlicensed frequency band, and relieving a pressure of sending the downlink data. Further, the solution of scheduling, by the network device, another terminal device that should send data to use the remaining time of the MCOT may implement good spectrum utilization efficiency, and at the same time reduce a quantity of terminal devices that use the Cat. 4 LBT procedure to preempt the unlicensed frequency band in a cell, thereby reducing the complexity of scheduling by the network device, increasing a probability of successfully preempting by a single terminal device, and reducing an access delay brought by the Cat. 4 LBT.

The uplink and downlink transmission process on the unlicensed spectrum in LAA, eLAA, and FeLAA systems may be described as: The network device selects, on the unlicensed spectrum (for example, 5150 to 5350 MHz), one/more unlicensed frequencies as working frequencies of a secondary cell (also referred to as a secondary serving cell) based on the network configuration and device capacity. It should be understood that, the unlicensed spectrum is a free shared frequency range divided based on the regulation of the country or region. The unlicensed spectrum is divided into several frequency bands based on 10 MHz or 20 MHz for use by different devices. A center frequency of each frequency band is referred to as a working frequency. The network device periodically broadcasts a DRS signal in a form of type 2 LBT, and the terminal device performs blind detection of the DRS signal in the unlicensed spectrum, to determine a working frequency, a cell ID, and frame boundary timing that are of the secondary cell. The terminal device reports access information through a primary cell, to complete initial access.

Figure 2:
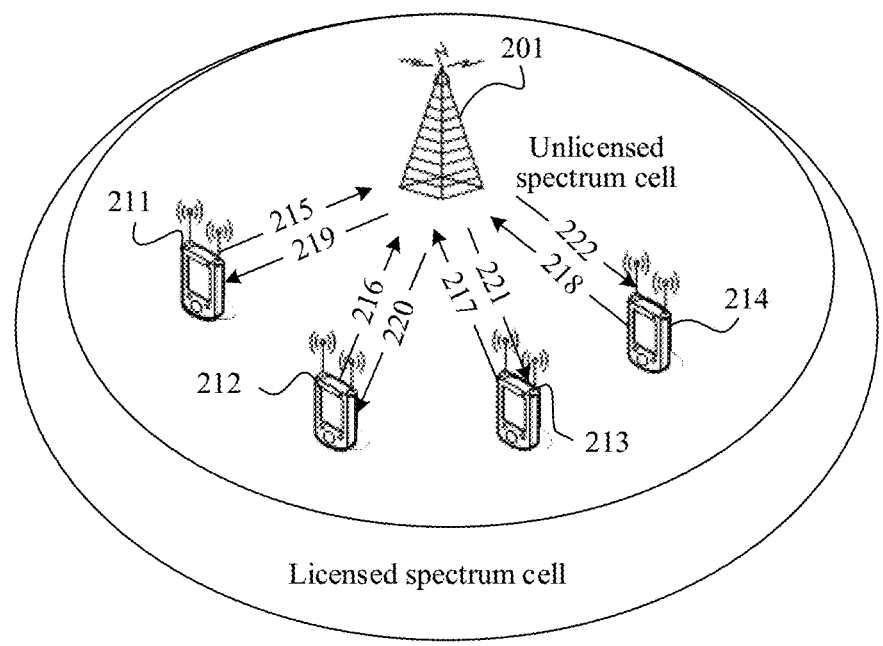
FIG. 2 is a schematic diagram of an application scenario according to an embodiment of the present disclosure.

FIG. 2 shows an application scenario according to an embodiment of the present disclosure, the scenario includes a network device 201 and terminal devices 211 to 214 that are located in a coverage range of the network device 201 and that communicate with the network device 201. It should be understood that, in this embodiment of the present disclosure, the terminal devices 211 to 214 are terminal devices that have completed initial access if there is no particular description. When there is downlink information to be sent, the network device 201 performs a Cat. 4 LBT procedure to preempt a channel, and sends downlink information. The terminal devices 211 to 214 knows a frame boundary of a secondary cell of an LAA system, performs blind detection based on a downlink frame structure of the LAA, and determines whether a current frame has a signal of the network device 201. If the signal of the network device 201 is detected, the signal of the network device 201 is processed (demodulation of a PDCCH, a PDSCH, and the like) based on a conventional LTE downlink data receiving process; and if no signal of the network device 201 is detected, a next radio frame is waited for the blind detection again. When the terminal devices 211 to 214 have uplink data to be sent, the terminal devices report an uplink data scheduling request (scheduling request, SR) through a primary cell. The network device 201 configures, through the primary cell or the secondary cell, a parameter of an uplink data channel for terminal devices that report the SR, and the parameter includes a type of the LBT, a time frequency resource, and the like. The terminal devices 211 to 214 perform the LBT procedure based on configuration information, and start to send the uplink data after the LBT succeeds. The network device/terminal device using the Cat. 4 LBT procedure to preempt an unlicensed frequency band may send a signal on the unlicensed frequency band, a sending time length (that is, channel occupancy time) cannot exceed maximum channel occupancy time (Maximum Channel Occupancy Time, MCOT) stipulated in the regulation, and the channel occupancy time of the network device/terminal device is calculated by actual time for sending data.

It should be understood that, in this embodiment of the present disclosure, the network device 201 may perform data communication with the terminal devices 211 to 214 on the unlicensed spectrum, and the scenario may be LAA, eLAA, and FeLAA systems that are in the LTE, a communications system using the unlicensed spectrum (for example, 5150 to 5350 MHz) in a 5G communications system, a MulteFire system independently working on the unlicensed spectrum, and the like. In the example of the application scenario of FIG. 2, a range covered by the network device 201 exists in a primary cell working on a licensed spectrum and a secondary cell working on the unlicensed spectrum, the network device 201 in the primary cell and the secondary cell may correspond to a same or two different physical sites (for example, a macro base station and a micro base station), and different sites use the X2 protocol to communicate with each other. The terminal devices 211 to 214 access the unlicensed frequency band through the secondary cell. The terminal devices 211 to 214 may be: (1) terminal devices that have data to be sent; (2) terminal devices that should retransmit the data; and (3) idle terminal devices without any uplink data.

Figure 3:
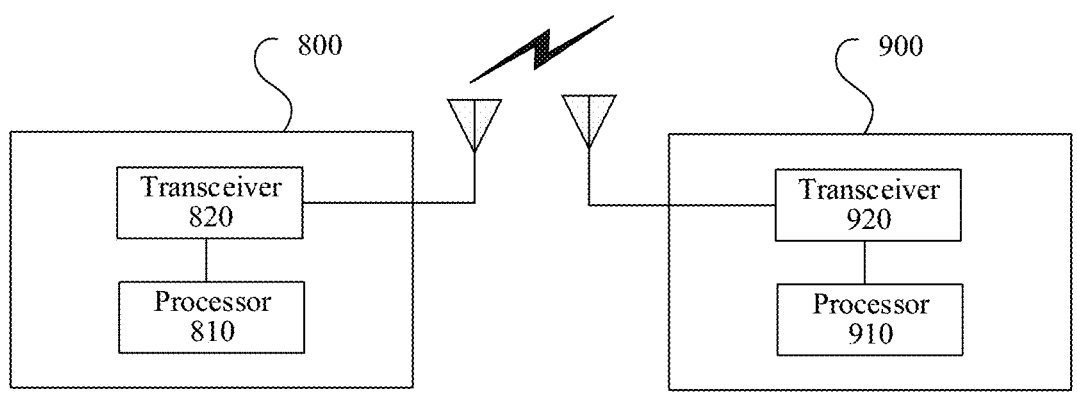
FIG. 3 is a schematic structural diagram of a communications device according to an embodiment of the present disclosure.

FIG. 3 shows a schematic block diagram of a wireless apparatus 800 and a wireless apparatus 900 according to an embodiment of the present disclosure. The wireless apparatus 800 and the wireless apparatus 900 may be configured to implement the method of embodiments of the present disclosure. The wireless apparatus 800 may be the network device 201 in FIG. 2, or may be a component of which the network device 201 implements a communications function. The wireless apparatus 900 may be the terminal devices 211 to 214 in FIG. 2, or may be a component of which the terminal devices 211 to 214 implement the communications function.

The wireless apparatus 800 and the wireless apparatus 900 respectively include a processor 810 and a processor 910. The processor 810 is configured to generate a baseband signal that carries to-be-sent information, and is configured to perform a process on the received baseband signal. The wireless apparatus 800 and the wireless apparatus 900 may further include a transceiver 820 and a transceiver 920 that are connected to the processor 810 and the processor 910 through a line, the transceiver 820 and the transceiver 920 are configured to perform a process on the baseband signal generated by the processor 810 and the processor 910, to convert the baseband signal into a radio frequency signal, and perform a process on a radio frequency signal received by an antenna, to convert the radio frequency signal into a baseband signal that can be processed by the processor. For example, when the wireless apparatus 800 is the network device 201, the wireless apparatus 800 may include the processor 810 and the transceiver 820. When the wireless apparatus 900 is one of the terminal devices 211 to 214, the wireless apparatus 900 may include the processor 910 and the transceiver 920.

With reference to the application scenario shown in FIG. 2, a communications method according to this embodiment of the present disclosure is described below. The network device 201 sends first signaling to a first terminal device, the first terminal device may be one of the terminal devices 211 to 214 in FIG. 2, the first signaling is used to instruct the first terminal device to perform, on the unlicensed spectrum, the LBT procedure used for occupying the unlicensed frequency band, that is, the Cat. 4 LBT procedure, and send uplink information within a first time length by using the unlicensed frequency band, where the first time length is a part of the maximum channel occupancy time MCOT obtained by the first terminal device on the unlicensed spectrum, and the first time length is less than the MCOT. The first terminal device receives the first signaling, performs, based on an instruction of the first signaling, on the unlicensed spectrum, the LBT procedure used for occupying the unlicensed frequency band, and sends the uplink information within the first time length through the occupied unlicensed frequency band. The network device receives the uplink information from the first terminal device within the first time length on the unlicensed spectrum, where the first time length is a part of the maximum channel occupancy time obtained by the first terminal device on the unlicensed spectrum, and the first time length is less than the maximum channel occupancy time.

Figure 4A:
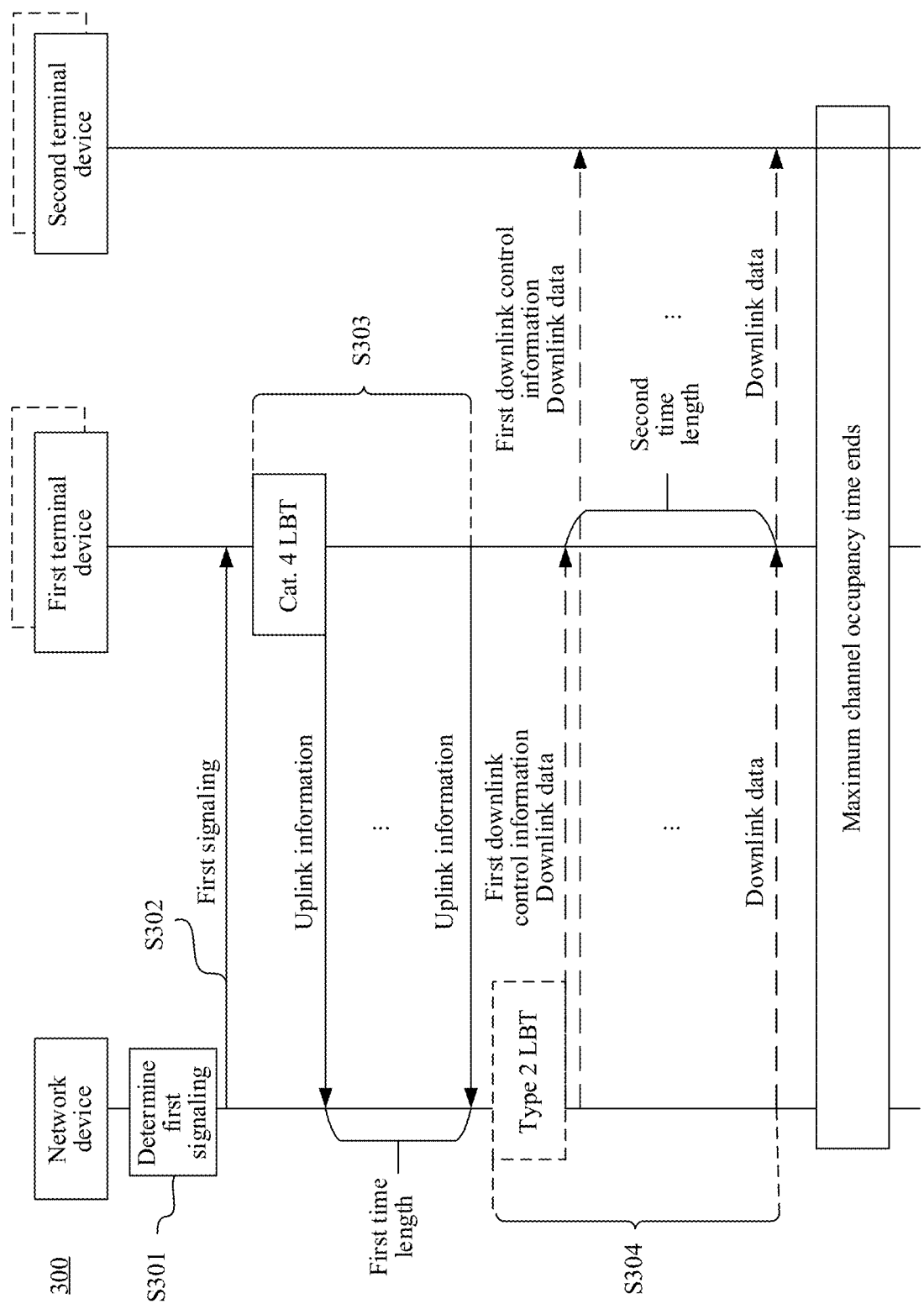
FIG. 4a is a schematic flowchart of a communications method according to an embodiment of the present disclosure.
Figure 4B:
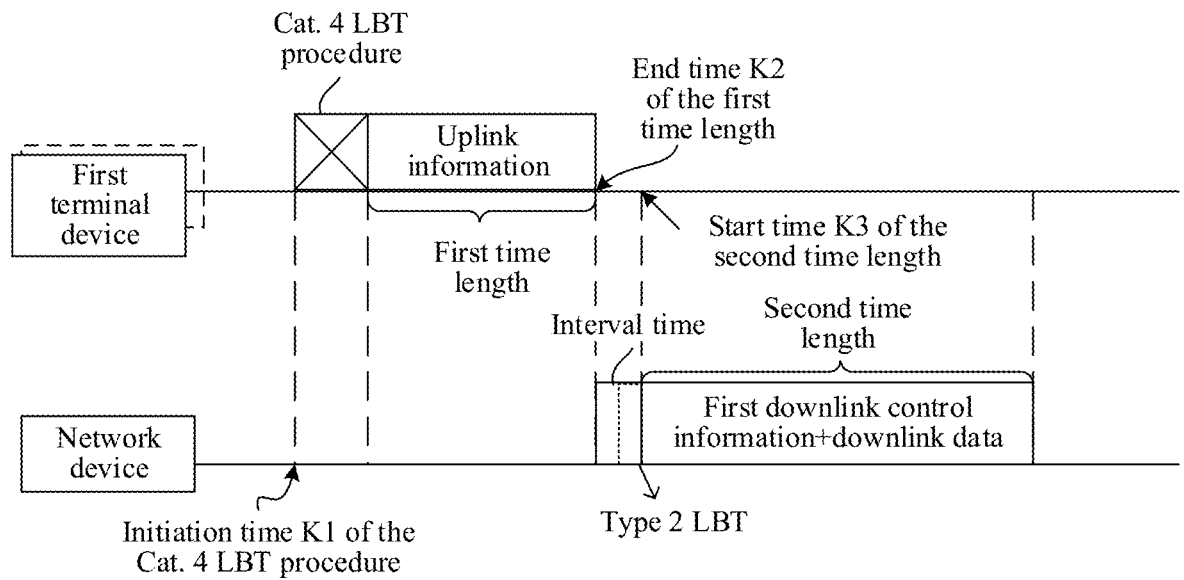
FIG. 4b is a schematic diagram of a time sequence relationship of a communications method according to an embodiment of the present disclosure.

FIG. 4a and FIG. 4b show an embodiment of the present disclosure, FIG. 4a is a schematic diagram of communication of a communications method 300 according to an embodiment of the present disclosure, and the method 300 includes the following blocks.

S301: A network device determines that first signaling is used to instruct a first terminal device to send uplink data or specified information, where the network device may be the network device 201 in FIG. 2, and the first terminal device may be one of the terminal devices 211 to 214 in FIG. 2. In an implementation, a processor 810 in the network device 201 may be configured to determine that the first signaling is used to instruct the first terminal device to send the uplink data or the specified information.

As described above, the first terminal device may be: (1) a terminal device that has data to be sent; (2) a terminal device that should retransmit data; and (3) an idle terminal device that has no uplink data. The network device may determine, based on the SR reported by the first terminal device in a primary cell or a secondary cell, or whether uplink data received last time is completed, or whether uplink data received last time is correct, whether the first terminal device in the secondary cell currently has uplink data to be sent.

When the first terminal device has uplink data to be sent, the first signaling is used to instruct the first terminal device to send the uplink data within a first time length by using an unlicensed spectrum; and when the first terminal device has no uplink data to be sent, the first signaling is used to instruct the first terminal device to send the specified information within a first time length by using an unlicensed spectrum. A type of the specified information may be channel state information, a measurement report, a buffer status report, an uplink reference signal, or a trailing bit.

Optionally, the first signaling includes at least one bit, and is used to indicate at least one piece of the following information: an initiation time K1 of an uplink listen before talk LBT procedure, an LBT procedure priority, a subcarrier set used to send the uplink information, the first time length, and the type of the specified information. Optionally, one or more pieces of the foregoing information may be a preset value in a protocol, and does not need to be indicated alone in the first signaling. For example, to obtain relatively long MCOT time, a communications system may predefine that the LBT procedure priority of the first terminal device scheduled to perform MCOT sharing is a relatively low value, for example, 3 or 4.

The first time length is duration in which the first terminal device sends the uplink information on an occupied unlicensed frequency band. Optionally, the first time length is a preset value.

Alternatively, optionally, the first time length is a value semi-statically configured by using higher layer signaling.

Alternatively, optionally, the first time length is notified by using physical layer signaling. In this possible situation, the first signaling is further used to indicate the first time length, and the network device may dynamically indicate the first time length based on a data volume of the first terminal device.

In any one of the foregoing configuration manners of the first time length, a specific implementation is that a fixed first time length such as a subframe is preset or pre-notified for a terminal device in different conditions; and another possible specific implementation is that two different first time lengths such as one or three subframes are preset or pre-notified for different situations. The network device performs the configuration respectively for a first terminal device in an idle condition and a first terminal device that has uplink data to be sent. For the first terminal device in the idle condition, the first time length is one subframe, and is only used to send the specified information, for example, an aperiodic report of the channel state information. For the first terminal device that has uplink data to be sent, the first time length is three subframes.

S302: The network device sends the first signaling to the first terminal device. The first signaling is used to instruct the first terminal device to perform, on an unlicensed spectrum, an LBT procedure used for occupying an unlicensed frequency band, namely, a Cat. 4 LBT procedure, and send the uplink information within a first time length by using the unlicensed frequency band. The first time length is a part of maximum channel occupancy time MCOT obtained by the first terminal device on the unlicensed spectrum, and the first time length is less than the MCOT. The first signaling may be physical layer signaling, and may be sent by using a licensed frequency band or by using the unlicensed frequency band. Because the licensed frequency band usually has an available downlink transmission resource, the first signaling may be sent in a timelier manner by using the licensed frequency band. While using the unlicensed frequency band to send the first signaling may avoid increasing and changing signaling on the existing licensed frequency band, to reduce frequency or complexity of blind detection performed by the terminal device on the licensed frequency band.

In an implementation, the processor 810 in the network device 201 may send the first signaling to the first terminal device by using a transceiver 820.

S303: The first terminal device receives the first signaling, performs, based on an instruction of the first signaling, on the unlicensed spectrum, the LBT procedure used for occupying the unlicensed frequency band, and sends the uplink information within the first time length on the occupied unlicensed frequency band. In an implementation, a processor 910 may receive the first signaling by using a transceiver 920, perform, based on the instruction of the first signaling, on the unlicensed spectrum, the LBT procedure used for occupying the unlicensed frequency band, and send the uplink information within the first time length on the occupied unlicensed frequency band.

In a possible situation, the first signaling instructs the first terminal device to send the uplink data. In this case, the first terminal device initiates the Cat. 4 LBT procedure at a time K1, and after the LBT procedure succeeds, sends the uplink data within the first time length on the occupied unlicensed frequency band.

In another possible situation, the first signaling instructs the first terminal device to send the specified information. In this case, the first terminal device initiates the Cat. 4 LBT procedure at the time K1, if the first terminal device generates to-be-sent uplink data before or during the Cat. 4 LBT, the first terminal device sends the specified information and the uplink data within the first time length on the occupied unlicensed frequency band; and if the first terminal device does not have uplink data to be sent after the Cat. 4 LBT procedure ends, the first terminal device sends the specified information within the first time length on the occupied unlicensed frequency band.

A type of the specified information is channel state information, a measurement report, a buffer status report, an uplink reference signal, or a trailing bit.

S304: The network device sends, after the first time length, first downlink control information and downlink data within a second time length by using the unlicensed frequency band preempted by the first terminal device. The unlicensed frequency band preempted by the first terminal device is an unlicensed frequency band on which the uplink information sent by the first terminal device is received.

The first downlink control information is used to schedule the first terminal device or a second terminal device to receive the downlink data within the second time length by using the unlicensed frequency band preempted by the first terminal device. The second time length follows the first time length, and a sum of the second time length and the first time length is less than or equal to the maximum channel occupancy time obtained by the first terminal device on the unlicensed frequency band.

In an implementation, the processor 810 may send the first downlink control information and the downlink data within the second time length by using the transceiver 820 using the unlicensed frequency band preempted by the first terminal device.

Optionally, after the first time length, the network device first performs short time LBT, namely, a type 2 LBT procedure, to momentarily monitor the frequency band, and if a type 2 LBT monitoring result is that a channel is idle, the network device starts to send the downlink data.

Optionally, after completing the LBT procedure on the unlicensed frequency band and preempting the channel based on configuration of the first downlink control information, the first terminal device sends the uplink data or the specified information within the first time length, and feeds back one piece of status information through an uplink control channel or data channel. The status information represents whether the first terminal accepts scheduling configuration of sharing of uplink sending time of the network device. If the first terminal device feeds back that the scheduling is accepted, a subsequent uplink sending sharing procedure may be performed; otherwise, the uplink sending sharing process ends.

FIG. 4b is a schematic diagram of a time sequence of a communications method 300 according to an embodiment of the present disclosure. A first terminal device initiates a Cat. 4 LBT procedure used to preempt an unlicensed frequency band at a time K1, and after the LBT procedure succeeds, sends uplink information on the occupied unlicensed frequency band. Duration in which the first terminal device sends the uplink information is a first time length. After the first time length ends, a network device uses remaining time of MCOT obtained by the first terminal device, that is, sends, by using the unlicensed frequency band preempted by the first terminal device, first downlink control information and downlink data within a second time length that follows the first time length, and a sum of the second time length and the first time length is less than or equal to the MCOT obtained by the first terminal device. An end time of the first time length is K2, and a start time of the second time length is K3. Because considering of a physical delay caused by uplink and downlink switching of the network device, or time used by the network device to perform a type 2 LBT procedure within interval time, or an uplink timing advance, or another reason, the time K2 and the time K3 are spaced by M1 OFDM symbol lengths, and M1 is an integer greater than 0.

Optionally, the network device performs the type 2 LBT procedure within the interval time, and momentarily monitors the frequency band. If a type 2 LBT monitoring result is that a channel is idle, the network device starts to send the downlink data.

The network device and the first terminal device perform the method 300, the network device may schedule the first terminal device to preempt the unlicensed frequency band and indicate the first time length in which the first terminal device sends the uplink information, and the network device sends, on the unlicensed frequency band preempted by the first terminal device, the downlink data by using the remaining time of the MCOT of the first terminal device, which is equivalent to scheduling the first terminal device to replace the network device to preempt an unlicensed spectrum. When the network device has a large volume of downlink data to be sent, but the uplink data of the first terminal device is non-emergency data and a data volume is small and scattered, the network device schedules the first terminal to preempt the unlicensed frequency band, and shares the remaining time of the MCOT obtained by the first terminal. This is equivalent to increasing a probability that the network device obtains an occupancy right of the unlicensed frequency band, and relieving pressure of sending the downlink data. In addition, the network device limits the first time length in which the first terminal sends the uplink information, to ensure that the network device obtains downlink sending time of a fixed time length, and implement a flexible configuration of uplink and downlink sending, thereby improving communication efficiency of a network.

Figure 5A:
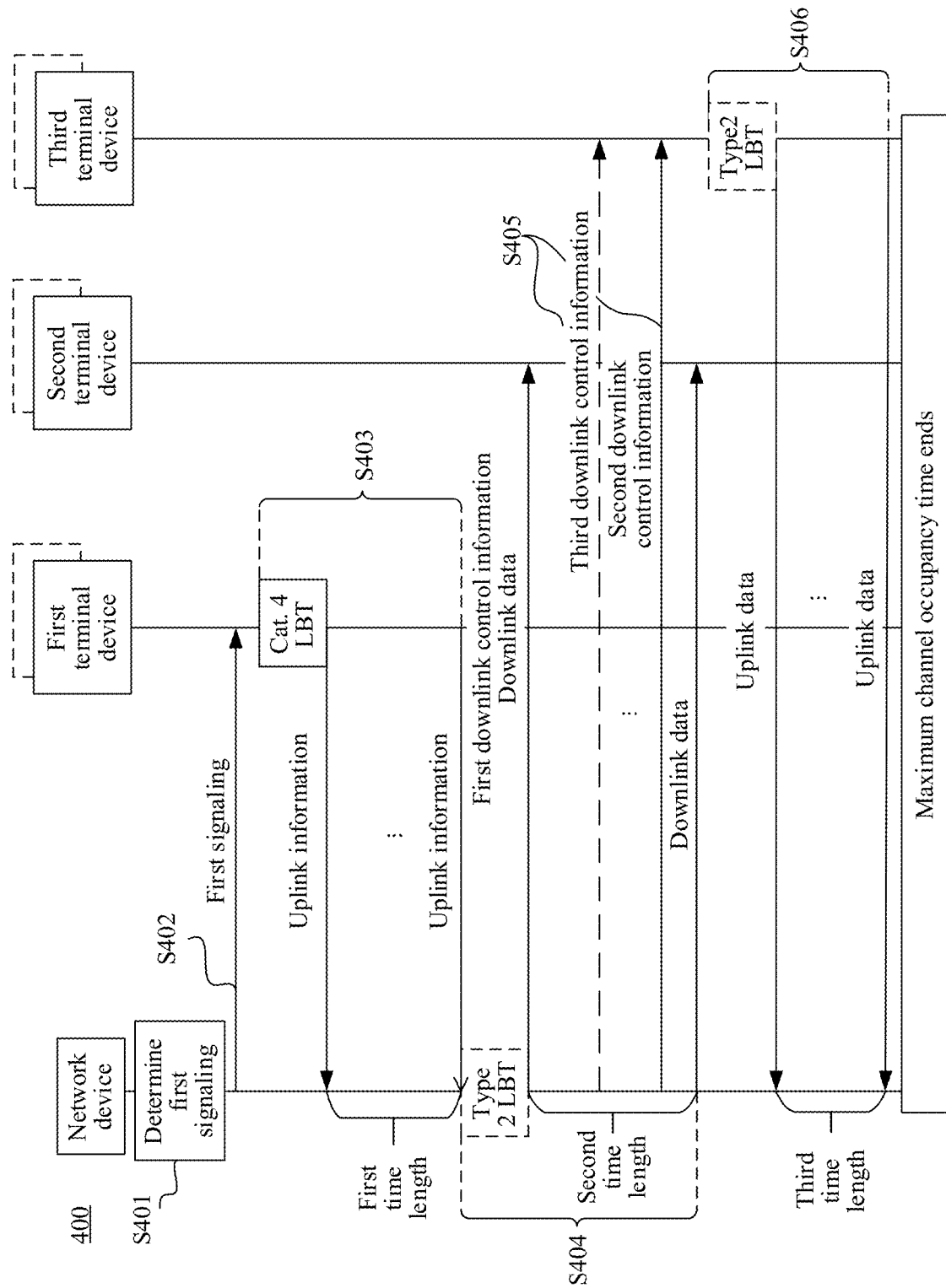
FIG. 5a is a schematic flowchart of another communications method according to an embodiment of the present disclosure.
Figure 5B:
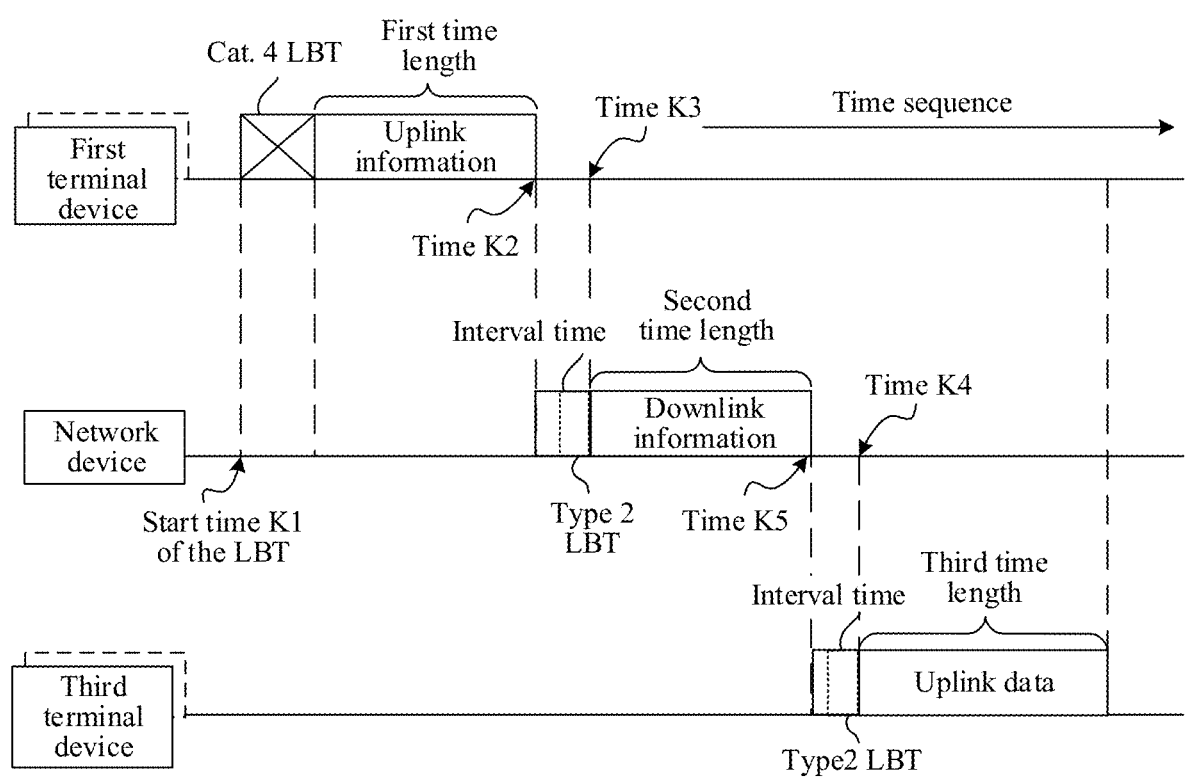
FIG. 5b is a schematic diagram of a time sequence relationship of another communications method according to an embodiment of the present disclosure.

FIG. 5a and FIG. 5b show another embodiment of the present disclosure, FIG. 5a is a schematic diagram of communication of a communications method 400 according to another embodiment of the present disclosure, and the method 400 includes the following blocks.

S401 is the same as block S301 of the method 300, S402 is the same as block S302 of the method 300, and S403 is the same as block S303 of the method 300. Details are not described herein again.

S404: A network device sends, after a first time length, first downlink control information and downlink data within a second time length by using an unlicensed frequency band preempted by a first terminal device, and the first downlink control information is used to schedule the first terminal device or a second terminal device to receive downlink data within the second time length by using the unlicensed frequency band preempted by the first terminal device. The second time length is a part of remaining time of the MCOT obtained by the first terminal device.

In an implementation, a processor 810 may send the first downlink control information and the downlink data within the second time length by using the unlicensed frequency band preempted by the first terminal device through a transceiver 820.

Optionally, after the first time length, the network device first performs a type 2 LBT procedure, to momentarily monitor the frequency band. If a type 2 LBT monitoring result is that a channel is idle, the network device starts to send the downlink data.

S405: The network device schedules a third terminal device to transmit the uplink data within a third time length by using the unlicensed frequency band preempted by the first terminal device, the third terminal device and the second terminal device may be a same terminal device, or may be different terminal devices. The third time length follows the second time length, and a sum of the third time length, the second time length, and the first time length is less than or equal to maximum channel occupancy time obtained by the first terminal device.

In an implementation, the processor 810 may schedule, by using the transceiver 820, the third terminal device to transmit the uplink data within the third time length by using the unlicensed frequency band preempted by the first terminal device.

In an example, the network device sends second downlink control information to the third terminal device within the second time length by using the unlicensed frequency band preempted by the first terminal device; and the second downlink control information includes at least one bit, and is used to indicate at least one piece of the following information: a subcarrier set used to transmit the uplink data, the third time length, and a start time K4 of the third time length.

In another example, before sending second control information, the network device first sends third control information. In this case, the third control information includes at least one bit, and is used to indicate: the subcarrier set used to transmit the uplink data and/or the third time length, and the second control information includes at least one bit, and is used to indicate the start time K4 of the third time length.

In an optional implementation, the network device sends third downlink control information to the third terminal device by using a licensed spectrum, and the network device sends the second downlink control information to the third terminal device within the second time length by using the unlicensed frequency band preempted by the first terminal device. Using the unlicensed frequency band to send the second downlink control information may avoid increasing and changing signaling on the existing licensed frequency band, to reduce a number of times or complexity of blind detection performed by the terminal device on the licensed frequency band.

In another optional implementation, the network device sends the third downlink control information and the second downlink control information within the second time length by using the unlicensed frequency band preempted by the first terminal device. Because the licensed frequency band usually has an available downlink transmission resource, the third downlink control information and the second downlink control information may be sent timelier by using the licensed frequency band to send, and the sending time is more flexible, for example, the network device may send the second downlink control information before the second time length by using the licensed frequency band, so that the third terminal device may prepare uplink sending data in advance, and the interval time between the time in which the network device sends the downlink information and the time in which the third terminal device sends the uplink data can be shortened.

S406: The third terminal device performs the uplink data transmission within the third time length by using the unlicensed frequency band preempted by the first terminal device.

In an implementation, the processor 910 may transmit the uplink data within the third time length by using the transceiver 920 using the unlicensed frequency band preempted by the first terminal device.

Optionally, after the second time length, the third terminal device first performs short time LBT, that is, the type 2 LBT procedure, to momentarily monitor the frequency band, and if a type 2 LBT monitoring result is that a channel is idle, the third terminal device starts to send the uplink data, and the third time length is a duration time length in which the third terminal device sends the uplink data.

FIG. 5b is a schematic diagram of a time sequence of another communications method 400 according to an embodiment of the present disclosure. A first terminal device initiates a Cat. 4 LBT procedure used to preempt an unlicensed frequency band at a time K1, and after the LBT procedure succeeds, sends uplink information to a network device on the occupied unlicensed frequency band. The duration in which the first terminal device sends the uplink information is a first time length. After the first time length ends, the network device uses a part of remaining time of the MCOT obtained by the first terminal device, that is, sending, by using the unlicensed frequency band preempted by the first terminal device, first downlink control information and downlink data to a second terminal device within a second time length that follows the first time length. Optionally, after the first time length, the network device first performs the type 2 LBT procedure, to momentarily monitor the frequency band, and if a type 2 LBT monitoring result is that a channel is idle, the network device starts to send the downlink data. The network device schedules a third terminal device to send, by using the unlicensed frequency band preempted by the first terminal device, uplink data to the network device within the third time length that follows the second time length, and a sum of the third time length, the second time length, and the first time length is less than or equal to the MCOT obtained by the first terminal device. An end time of the first time length is K2, a start time of the second time length is K3, the time K2 and the time K3 are spaced by M1 OFDM symbol lengths, and M1 is an integer greater than 0; and an end time of the second time length is K5, a start time of the third time length is K4, the time K4 and the time K5 are spaced by M2 OFDM symbol lengths, and M2 is an integer greater than 0.

Optionally, after the second time length, the third terminal device performs short time LBT within interval time, that is, the type 2 LBT procedure, to momentarily monitor the frequency band, and if a type 2 LBT monitoring result is that a channel is idle, the third terminal device starts to send the uplink data.

The network device and the first terminal device, the second terminal device, and the third terminal device perform the method 400, the network device schedules the first terminal device to preempt the unlicensed frequency band and indicates the first time length in which the first terminal device sends the uplink information, and the network device sends, on the unlicensed frequency band preempted by the first terminal device, the downlink data by using a part of the remaining time of the MCOT of the first terminal device, thereby increasing a probability that the network device obtains an occupancy right of the unlicensed frequency band, and releasing the pressure of sending the downlink data. In addition, the network device limits the first time length in which the first terminal sends the uplink information, which may ensure that the network device obtains a fixed time length to send the downlink information, and implement a flexible configuration of uplink and downlink sending, thereby improving communication efficiency of the network. At the same time, the network device schedules the third terminal device to send the uplink data by using the remaining time of the MCOT obtained by the first terminal device, in the system, the network device has downlink data to be sent, while the terminal device should frequently send the uplink data, and each time, in the situation of a relatively small data volume, good spectrum utilization efficiency may be implemented, and at the same time, a quantity of terminal devices that use the Cat. 4 LBT procedure to preempt the unlicensed frequency band in a cell is reduced, thereby reducing the complexity of scheduling by the network device, and reducing an access delay brought by performing the Cat. 4 LBT by the third terminal device.

Figure 6A:
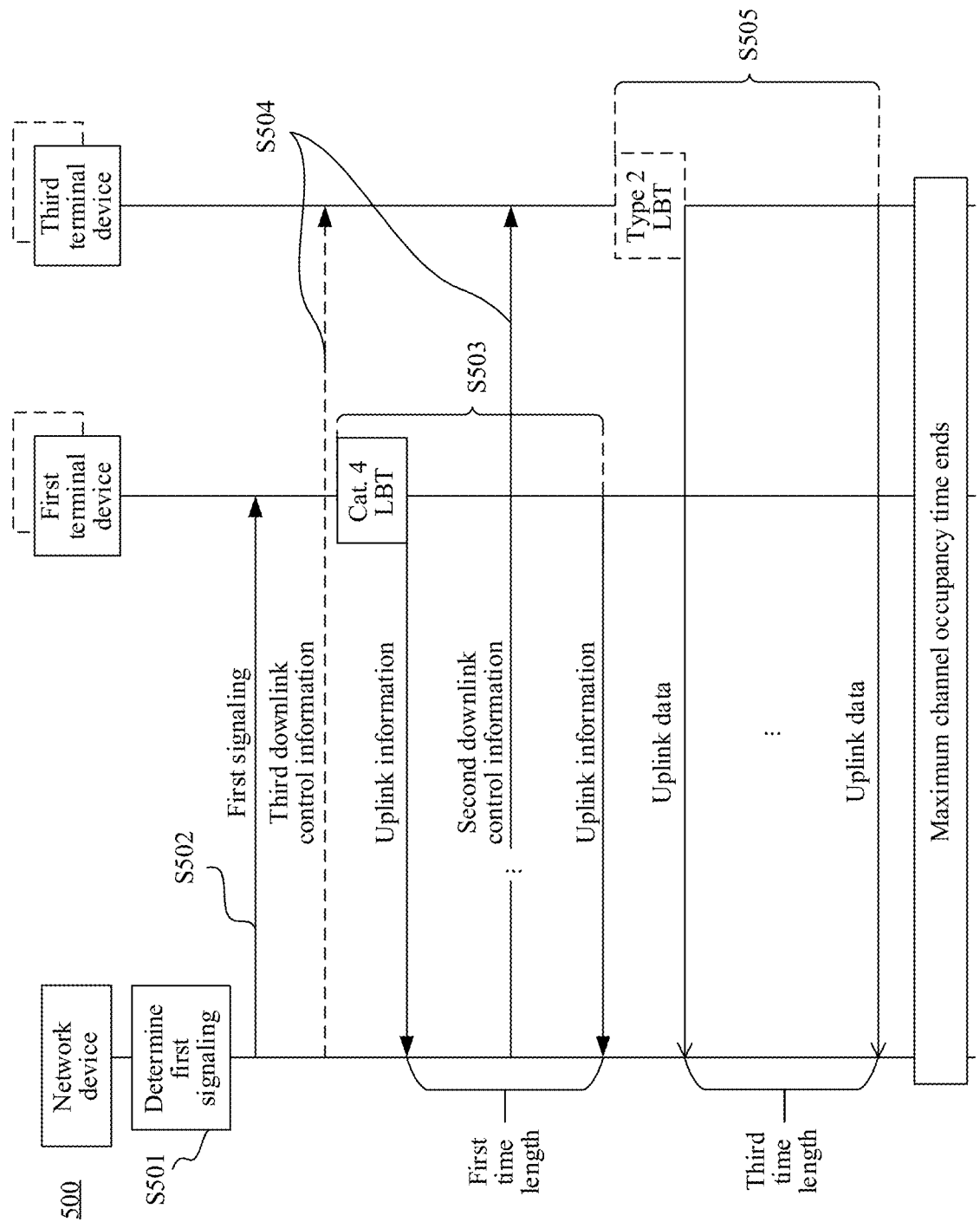
FIG. 6a is a schematic flowchart of still another communications method according to an embodiment of the present disclosure.
Figure 6B:
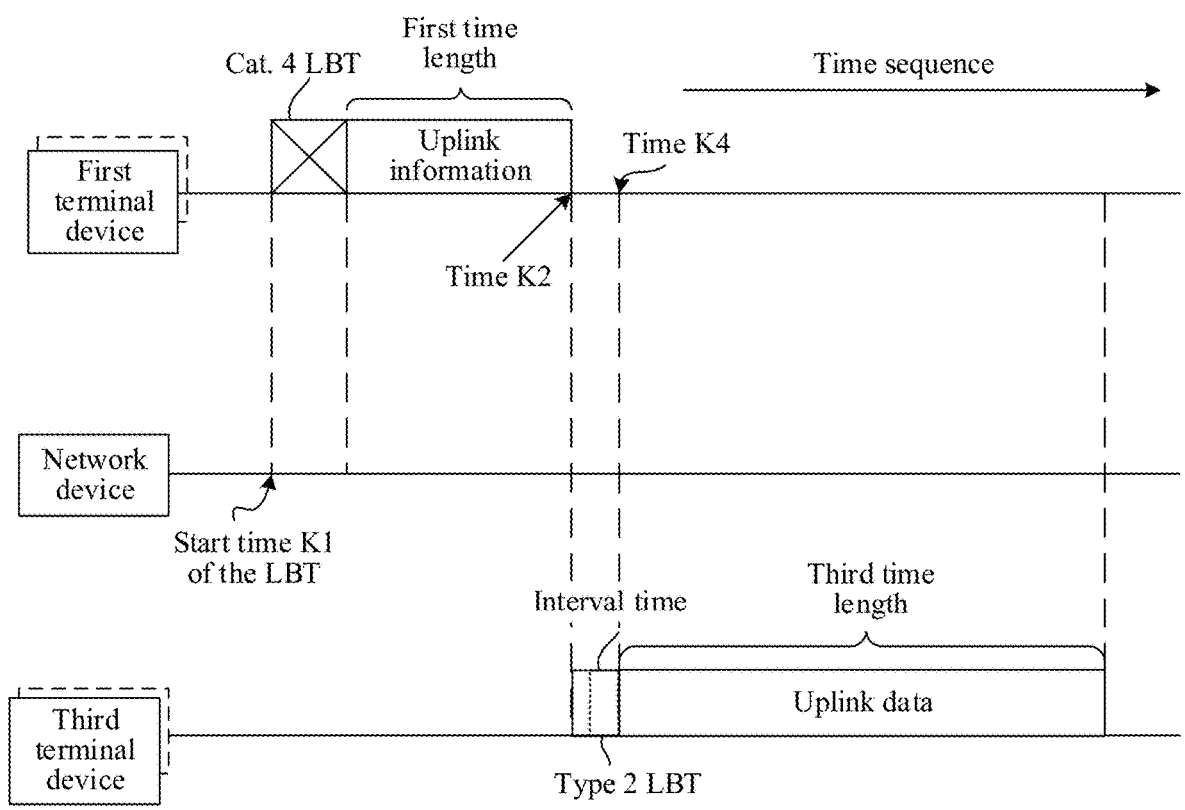
FIG. 6b is a schematic diagram of a time sequence relationship of still another communications method according to an embodiment of the present disclosure.

FIG. 6a and FIG. 6b show still another embodiment of the present disclosure, FIG. 6a is a schematic diagram of communication of a communications method 500 according to still another embodiment of the present disclosure, and the method 500 includes the following blocks.

S501 is the same as block S301 of the method 300, S502 is the same as block S302 of the method 300, and S503 is the same as block S303 of the method 300. Details are not described herein again.

S504: A network device schedules, before an end time of a first time length, a third terminal device to transmit the uplink data within a third time length by using an unlicensed frequency band preempted by a first terminal device, where the third time length follows the first time length, and a sum of the third time length and the first time length is less than or equal to maximum channel occupancy time obtained by the first terminal device.

In an implementation, a processor 810 may schedule, before the end time of the first time length and by using a transceiver 820, the third terminal device to transmit the uplink data within the third time length by using the unlicensed frequency band preempted by the first terminal device.

In an example, second downlink control information includes at least one bit, and is used to indicate at least one piece of the following information: a subcarrier set used to transmit the uplink data, the third time length, and a start time K4 of the third time length. The network device sends, before the end time of the first time length, the second downlink control information to the third terminal device by using a licensed spectrum, and instructs the third terminal device to transmit the uplink data within the third time length by using the unlicensed frequency band preempted by the first terminal device. Compared with using the unlicensed frequency band to send second control information, that the network device sends the second downlink control information by using the licensed spectrum does not need to occupy the MCOT preempted by the first terminal device on the unlicensed spectrum, and the network device may allocate remaining time of the MCOT to the third terminal device as much as possible.

In another example, the second downlink control information includes at least one bit, and is used to indicate the start time K4 of the third time length. In this case, before sending the second downlink control information, the network device first sends third downlink control information to the third terminal device by using the licensed spectrum, and the third downlink control information includes at least one bit, and is used to indicate the subcarrier set used to transmit the uplink data and/or the third time length. After receiving third control information, the third terminal device starts to packet assembly based on third time length information, and waits the second downlink control information to indicate the start time K4 of the third time length. The network device sends the second downlink control information to the third terminal device before an end time K2 of the first time length, and the time K2 and the time K4 are spaced by an integer number that is greater than 0 and that is of OFDM symbol lengths.

S505: The third terminal device performs the uplink data transmission within the third time length by using the unlicensed frequency band preempted by the first terminal device.

In an implementation, a processor 910 may transmit the uplink data within the third time length by using the transceiver 920 using the unlicensed frequency band preempted by the first terminal device.

Optionally, after the first time length, the third terminal device performs a short time LBT within interval time, that is, the type 2 LBT procedure, to momentarily monitor the frequency band, and if a type 2 LBT monitoring result is that a channel is idle, the third terminal device starts to send the uplink data, and the third time length is a duration time length in which the third terminal device sends the uplink data.

FIG. 6b is a schematic diagram of a time sequence of still another communications method 500 according to an embodiment of the present disclosure. A first terminal device initiates a Cat. 4 LBT procedure used to preempt an unlicensed frequency band at a time K1, and after the LBT procedure succeeds, sends uplink information to a network device on the occupied unlicensed frequency band. The duration in which the first terminal device sends the uplink information is a first time length. The network device schedules a third terminal device to send, by using the unlicensed frequency band preempted by the first terminal device, uplink data to the network device within a third time length that follows the first time length, and a sum of the third time length and the first time length is less than or equal to the MCOT obtained by the first terminal device. An end time of the first time length is K2, a start time of the third time length is K4, the time K4 and the time K2 are spaced by M3 OFDM symbol lengths, and M3 is an integer greater than 0.

Optionally, after the first time length, the third terminal device performs short time LBT within interval time, that is, the type 2 LBT procedure, to momentarily monitor the frequency band, and if a type 2 LBT monitoring result is that a channel is idle, the third terminal device starts to send the uplink data.

The network device, the first terminal device, and the third terminal device perform the method 500, the network device schedules the first terminal device to preempt the unlicensed frequency band and indicates the first time length in which the first terminal device sends the uplink information, and the network device limits the first time length in which the first terminal sends the uplink information, which may ensure that the third terminal device obtains uplink sending time of a fixed time length, and implement a flexible configuration of sending time of the first terminal device and the third terminal device, thereby improving communication efficiency of the network. At the same time, the network device schedules the third terminal device to send the uplink data by using the remaining time of the MCOT obtained by the first terminal device, in the system, the terminal device should frequently send the uplink data, and each time, in the situation of a relatively small data volume, good spectrum utilization efficiency may be implemented, and at the same time, a quantity of terminal devices that use the Cat. 4 LBT procedure to preempt the unlicensed frequency band in a cell is reduced, thereby reducing an access delay brought by the Cat. 4 LBT, reducing the complexity of scheduling by the network device, and increasing a probability that a single terminal device successfully preempts the unlicensed frequency band.

Figure 7:
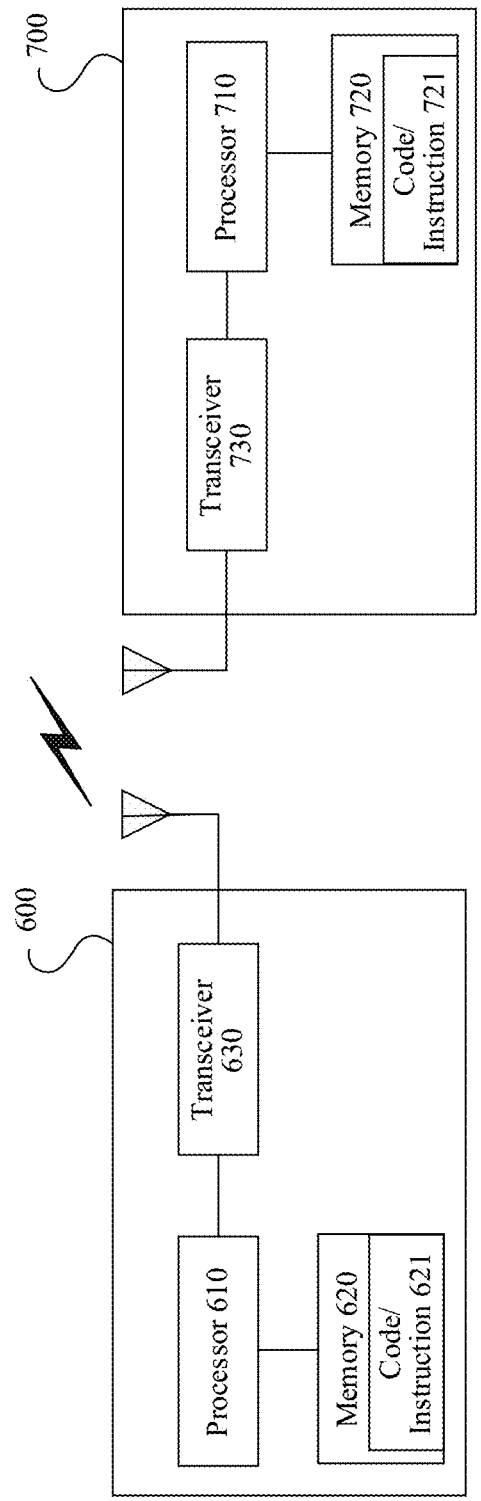
FIG. 7 is a schematic structural diagram of another network device and terminal device according to an embodiment of the present disclosure.

FIG. 7 shows a schematic block diagram of another wireless apparatus 600 and wireless apparatus 700 according to an embodiment of the present disclosure.

The wireless apparatus 600 may be the network device in the foregoing embodiments of the present disclosure, or may be a component in the network device. The wireless apparatus 600 includes a processor 610, a transceiver 630, and a memory 620, and the memory 620 is configured to store computer-executable program code or an instruction. The transceiver 630 is configured to send and receive a signal, and the signal may be a simulate radio frequency signal, or a digital radio frequency signal, or a radio signal. The processor 610 reads and executes the program code or instruction in the memory 620. When the program code or instruction in the memory 620 is executed by the processor 610, the wireless apparatus 600 is controlled to implement functions of the network device in the foregoing method.

The wireless apparatus 700 may be the terminal device in the foregoing embodiments of the present disclosure, or may be a component in the terminal device. The wireless apparatus 700 includes a processor 710, a transceiver 730, and a memory 720. The memory 720 is configured to store computer-executable program code or an instruction. The transceiver 730 is configured to send and receive a signal, and the signal may be a simulate radio frequency signal, or a digital radio frequency signal, or a radio signal. The processor 710 reads and executes the program code or instruction in the memory 720. When the program code or instruction in the memory 720 is executed by the processor 610, the wireless apparatus 700 is controlled to implement functions of the terminal device in the foregoing method.

It may be understood that, FIG. 7 merely shows a simplified design of the wireless apparatus 600 and wireless apparatus 700. In actual application, the wireless apparatus 600 and wireless apparatus 700 may include any quantity of transceivers, processors, and memories, and all structures that can implement the present disclosure fall within the protection scope of the present disclosure.

Embodiments of the present disclosure further provide a communications apparatus, a structure of the communications apparatus includes a processor and a memory connected to the processor through a line, and the memory may be built inside the processor, or externally disposed outside the processor. The processor includes an input output interface, the input output interface is configured to send a signal and receive a signal, the sent signal may carry information sent by the apparatus to another communication equipment, and the received signal may carry information received from another communication equipment. A signal output by the input output interface, for example, may be a baseband signal that is not modulated, or a baseband signal on which digital modulation has been performed, or a baseband signal on which analog modulation has been performed, or may be a modulated intermediate/radio frequency signal. The memory is configured to store an instruction. The processor is configured to read and execute the instruction in the memory to control the communications apparatus to perform the method in the foregoing embodiments.

The processor for performing apparatus functions of the foregoing network device and terminal device in the present disclosure may be a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor.

Method or algorithm blocks described in combination with the content disclosed in the present disclosure may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a memory of any other form known in the art. For example, a storage medium is coupled to a processor, so that the processor can read information from the storage medium or write information into the storage medium.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

Examples of the present disclosure also provide an apparatus (for example, an integrated circuit, a wireless device, a circuit module, or the like), configured to implement the foregoing method. The apparatus described in this specification may be a self-supporting device or some of relatively large devices. The device may be (i) a self-supporting IC; (ii) a set having one or more ICs, and the set may include a memory IC configured to store data and/or an instruction; (iii) an RFIC, such as an RF receiver or an RF transmitter/receiver; (iv) an ASIC, such as a mobile station modem; (v) a module that can be embedded in another device; (vi) a receiver, a cellular phone, a wireless device, a handset, or a mobile unit; (vii) and the like.

The method and apparatus provided in the embodiments of the present disclosure may be applied to the terminal device or the network device (may be collectively referred to as the wireless device). The terminal device or the network device or the wireless device may include a hardware layer, an operating system layer that runs on the hardware layer, and an application layer that runs on the operating system layer. The hardware layer includes hardware such as a central processing unit (central processing unit, CPU), a memory management unit (memory management unit, MMU), and a memory (also referred to as a main memory). The operating system may be any one or more computer operating systems such as a Linux operating system, a Unix operating system, an Android operating system, an iOS operating system, or a windows operating system that implement service processing by using a process (process). The application layer includes applications such as a browser, an address book, word processing software, and instant messaging software. In the embodiments of the present disclosure, a specific structure of an execution body of the method is not limited in the embodiments of the present disclosure, provided that communication can be performed based on the signal transmission method in the embodiments of the present disclosure by running a program of code recording the method in the embodiments of the present disclosure. For example, the execution body of the wireless communication method in the embodiments of the present disclosure may be a terminal device or a network device, or a functional module that is in a terminal device or a network device and that can invoke a program and execute the program.

A person of ordinary skill in the art may be aware that, in combination with the examples described in the embodiments disclosed in this specification, units and algorithm blocks may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present disclosure.

In addition, aspects or features in the embodiments of the present disclosure may be implemented as a method, an apparatus or a product that uses standard programming and/or engineering technologies. The term "product" used in this disclosure covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (compact disc, CD), a digital versatile disc (digital versatile disc, DVD), a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the process or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of the embodiments of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the blocks of the methods described in the embodiments of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A communications method, comprising: sending, by a network device, first signaling to a first terminal device, wherein the first signaling is used to instruct the first terminal device to perform, on an unlicensed spectrum, a listen before talk (LBT) procedure used for occupying an unlicensed frequency band, and send uplink information within a first time length on the unlicensed frequency band; receiving, by the network device on the unlicensed spectrum, the uplink information from the first terminal device within the first time length, wherein the first time length is a part of maximum channel occupancy time obtained by the first terminal device on the unlicensed spectrum, and the first time length is less than the maximum channel occupancy time; and sending, by the network device after the first time length, first downlink control information within a second time length to schedule the first terminal device or a second terminal device to receive downlink data within the second time length by using the unlicensed frequency band preempted by the first terminal device.

2. The method according to claim 1, wherein
the first signaling comprises at least one bit, and indicates at least one piece of the following information: an initiation time K1 of an uplink listen before talk LBT procedure, an LBT procedure priority, a subcarrier set used to send the uplink information, the first time length, and a type of specified information.

3. The method according to claim 1, wherein an end time of the first time length is K2, a start time of the second time length is K3, the time K2 and the time K3 are spaced by M1 OFDM symbol lengths, and M1 is an integer greater than 0.

4. The method according to claim 1, wherein the second time length follows the first time length, and a sum of the second time length and the first time length is less than or equal to the maximum channel occupancy time.

5. The method according to claim 1, comprising:
sending, by the network device, second downlink control information within the second time length by using the unlicensed frequency band preempted by the first terminal device; or
sending, by the network device, second downlink control information by using a licensed frequency band, wherein
the second downlink control information is used to schedule the first terminal device or the second terminal device or a third terminal device to transmit uplink data within a third time length by using the unlicensed frequency band preempted by the first terminal device.

6. The method according to claim 1, wherein the unlicensed frequency band preempted by the first terminal device is an unlicensed frequency band on which the uplink information sent by the first terminal device is received.

7. A wireless apparatus, comprising: a processor and a transceiver connected to the processor, the transceiver, configured to send or receive a signal; the processor, configured to send first signaling to a first terminal device by using the transceiver, wherein the first signaling instructs the first terminal device to perform, on an unlicensed spectrum, a listen before talk (LBT) procedure used for occupying an unlicensed frequency band, and send uplink information within a first time length on the unlicensed frequency band; the transceiver, further configured to receive, on the unlicensed frequency band, the uplink information from the first terminal device within the first time length by using the transceiver, wherein the first time length is a part of maximum channel occupancy time obtained by the first terminal device on the unlicensed frequency band, and the first time length is less than the maximum channel occupancy time; and the processor is configured to send, after the first time length, first downlink control information and downlink data within a second time length to schedule the first terminal device or a second terminal device to receive the downlink data within the second time length by using the transceiver using the unlicensed frequency band preempted by the first terminal device.

8. The wireless apparatus according to claim 7, wherein the first signaling comprises at least one bit, and indicates at least one piece of the following information: an initiation time K1 of an uplink listen before talk LBT procedure, an LBT procedure priority, a subcarrier set used to send the uplink information, the first time length, and a type of specified information.

9. The wireless apparatus according to claim 7, wherein an end time of the first time length is K2, a start time of the second time length is K3, the time K2 and the time K3 are spaced by M1 OFDM symbol lengths, and M1 is an integer greater than 0.

10. The wireless apparatus according to claim 7, wherein the second time length follows the first time length, and a sum of the second time length and the first time length is less than or equal to the maximum channel occupancy time.

11. The wireless apparatus according to claim 7, wherein
the processor is configured to send second downlink control information within the second time length by using the transceiver using the unlicensed frequency band preempted by the first terminal device; or
the processor is configured to send second downlink control information by using the transceiver using a licensed frequency band; and
the second downlink control information is used to schedule the first terminal device or the second terminal device or a third terminal device to transmit uplink data within a third time length by using the unlicensed frequency band preempted by the first terminal device.

12. The wireless apparatus according to claim 7, wherein the unlicensed frequency band preempted by the first terminal device is an unlicensed frequency band on which the uplink information sent by the first terminal device is received.

13. A communications method, comprising: receiving, by a first terminal device, first signaling sent by a network device, wherein the first signaling is used to instruct a first terminal device to perform, on an unlicensed spectrum, a listen before talk (LBT) procedure used for occupying an unlicensed frequency band, and send uplink information within a first time length on the unlicensed frequency band; performing, by the first terminal device based on the first signaling, on the unlicensed spectrum, the LBT procedure used for occupying the unlicensed frequency band, and sending the uplink information within the first time length by using the unlicensed frequency band, wherein the first time length is a part of maximum channel occupancy time obtained by the first terminal device on the unlicensed spectrum, and the first time length is less than the maximum channel occupancy time; and receiving, by the first terminal device, after the first time length, first downlink control information and downlink data from the network device within a second time length to schedule the first terminal device or a second terminal device to receive the downlink data within the second time length by using the unlicensed frequency band.

14. The method according to claim 13, wherein
the first signaling comprises at least one bit, and indicates at least one piece of the following information: an initiation time K1 of an uplink listen before talk LBT procedure, an LBT procedure priority, a subcarrier set used to send the uplink information, the first time length, and a type of specified information.

15. The method according to claim 13, wherein the second time length follows the first time length, and a sum of the second time length and the first time length is less than or equal to the maximum channel occupancy time.

16. The method according to claim 13, wherein the unlicensed frequency band is an unlicensed frequency band on which the first terminal device sends the uplink information.

17. A wireless apparatus, comprising: a processor and a transceiver connected to the processor, the processor, configured to receive first signaling sent by a network device by using the transceiver, wherein the first signaling is used to instruct a first terminal device to perform, on an unlicensed spectrum, a listen before talk (LBT) procedure used for occupying an unlicensed frequency band, and send uplink information within a first time length on the unlicensed frequency band; the processor, configured to send, on the unlicensed frequency band, the uplink information within the first time length by using the transceiver, wherein the first time length is a part of maximum channel occupancy time obtained by the first terminal device on the unlicensed spectrum, and the first time length is less than the maximum channel occupancy time; and the processor is further configured to receive, after the first time length, first downlink control information and downlink data from the network device within a second time length to schedule the first terminal device or a second terminal device to receive the downlink data within the second time length by using the unlicensed frequency band.

18. The wireless apparatus according to claim 17, wherein
the first signaling comprises at least one bit, and indicates at least one piece of the following information: an initiation time K1 of an uplink listen before talk LBT procedure, an LBT procedure priority, a subcarrier set used to send the uplink information, the first time length, and a type of specified information.

19. The wireless apparatus according to claim 17, wherein the second time length follows the first time length, and a sum of the second time length and the first time length is less than or equal to the maximum channel occupancy time.

20. The wireless apparatus according to claim 17, wherein the unlicensed frequency band is an unlicensed frequency band on which the first terminal device sends the uplink information.

* * * * *